(12) United States Patent
Kiuchi et al.

(10) Patent No.: US 8,334,932 B2
(45) Date of Patent: Dec. 18, 2012

(54) IMAGE PROCESSING DEVICE, IMAGE DISPLAY DEVICE, AND IMAGE PROCESSING METHOD

(75) Inventors: Shinya Kiuchi, Iizuka (JP); Jun Ikeda, Fukuoka (JP); Shuichi Ojima, Fukuoka (JP); Tsuyoshi Hirashima, Kasuya-Gun (JP); Ryouta Hata, Iizuka (JP)

(73) Assignee: Panasonic Corporation, Osaka (JP)

( * ) Notice: Subject to any disclaimer, the term of this patent is extended or adjusted under 35 U.S.C. 154(b) by 506 days.

(21) Appl. No.: 12/728,374

(22) Filed: Mar. 22, 2010

(65) Prior Publication Data

US 2010/0194990 A1    Aug. 5, 2010

Related U.S. Application Data

(63) Continuation of application No. 10/881,176, filed on Jul. 1, 2004, now abandoned.

(30) Foreign Application Priority Data

Jul. 3, 2003    (JP) .................................. 2003-190852

(51) Int. Cl.
*H04N 5/14* (2006.01)

(52) U.S. Cl. .......................... 348/700; 348/701; 348/618

(58) Field of Classification Search ........... 348/700–701
See application file for complete search history.

(56) References Cited

U.S. PATENT DOCUMENTS

| | | | |
|---|---|---|---|
| 5,123,060 A | 6/1992 | Cho et al. | |
| 5,923,784 A | 7/1999 | Rao et al. | |
| 7,684,492 B2 * | 3/2010 | Seo | 375/240.27 |
| 2002/0076117 A1 | 6/2002 | Allred et al. | |
| 2002/0145678 A1 * | 10/2002 | Suzuki et al. | 348/675 |
| 2003/0184826 A1 * | 10/2003 | Takemoto et al. | 358/518 |
| 2004/0208363 A1 | 10/2004 | Berge et al. | |
| 2005/0001935 A1 | 1/2005 | Kiuchi et al. | |

FOREIGN PATENT DOCUMENTS

| | | |
|---|---|---|
| JP | 2000-250463 | 9/2000 |
| JP | 2002-262303 | 9/2002 |

* cited by examiner

*Primary Examiner* — Jayanti K Patel
*Assistant Examiner* — Jessica Prince
(74) *Attorney, Agent, or Firm* — Wenderoth, Lind & Ponack, L.L.P.

(57) ABSTRACT

An image processing device includes a target correction amount calculating unit operable to calculate a target correction amount based on input image signals, a frame memory operable to store the input image signals, and a scene change amount calculating unit operable to calculate a scene change amount based on an input image signal of a present frame and an input image signal of a previous frame. Moreover, the image processing device includes a correction amount calculating unit operable to calculate a correction amount for the input image signal of the present frame, based on the target correction amount and the scene change amount, and a correcting unit operable to perform image quality correction to the input image signal of the present frame to generate a corrected input image signal, thereby outputting a corrected input image signal as an output image signal.

4 Claims, 12 Drawing Sheets

PRIOR ART

IMAGE PROCESSING DEVICE, IMAGE DISPLAY DEVICE, AND IMAGE PROCESSING METHOD

This is a Rule 1.53(b) Continuation of application Ser. No. 10/881,176, filed Jul. 1, 2004 now abandoned.

BACKGROUND OF THE INVENTION

1. Field of the Invention

The present invention relates to an image processing device operable to improve deterioration in image quality that may occur at scene change of images, an image display device using the image processing device, and an image processing method to be practiced in the image processing device.

2. Description of the Related Art

Thanks to the development of information-oriented society, people can easily send and receive not only character information and speech information but also image information with a personal computer and a cellular phone.

In video devices that send and receive the image information, high quality image display on the image display device has been pursued in order to display finer images.

One of the methods for attaining high quality image display is performing image quality correction to an image signal for every frame.

In the method, if correction for brightness value and chroma value of the image signal is often performed, flickering due to the correction can occur when the image signal is displayed on the image display device. The prior art employs technique that slows down temporally the correction, as slow as people can not perceive the correction, so that the flickering is suppressed.

However, when a scene is switched to change the image signal greatly frame by frame, over-suppressed correction may fail in performing desirable swift correction, resulting in a correction gap in the course of correction and hence in deterioration of image quality.

In order to solve the problem, in Published Japanese Patent Application Laid-Open No. 2002-262303 (reference 1), a scene detecting means operable to detect a scene change of an image signal (for example, switching of displayed scenes) is provided, so that change amount of correction is controlled, thereby suppressing the flickering and the correction gap.

In the following, an image quality correcting method according to the prior art, as represented by the reference 1, is explained.

FIG. 17 is a block diagram of the prior image correction device. The prior image correction device comprises a correcting unit 1, a target correction amount calculating unit 2, a change amount controlling unit 3, and a scene change detecting unit 4.

In FIG. 17, the correcting unit 1 performs image quality correction to an input image signal that is inputted into an input terminal 5, and outputs the corrected image signal to an output terminal 6 as an output image signal. At this time, the change amount controlling unit 3 calculates a correction amount of the image quality correction that is mentioned above, based on a target correction amount that the target correction amount calculating unit 2 has calculated, and detected result of the scene change detecting unit 4. The scene change detecting unit 4 is provided in order to detect a rapid change of a scene (for example, scene switching). The change amount controlling unit 3 suppresses flickering and a correction gap by calculating the correction amount that the correcting unit 1 uses, based on the correction amount to the present scene and the correction amount according to the scene change.

FIG. 18 shows relationship between the input change amount and the output change amount in the prior image correction device. In the prior image correction device, a curve 8 defines the relationship between the input change amount and the output change amount. Especially when the input change amount is located between a point P and a point Q, the output change amount is set as a constant value R. Thus, flickering of the screen due to the rapid scene change can be prevented.

However, since the prior scene change detecting method detects only the occurrence of the scene change and performs image quality correction by the detected result, image quality correction considering the magnitude of the scene change can not be performed, and a high-performance image quality correction can not be performed, either.

In detecting the scene change, if so-called false detection occurs, such that a scene change detecting signal is not sent even though the scene has actually changed and that a scene change detecting signal is sent even though the scene has not changed, a gap between the correction change amount and the actual change amount becomes significantly great; therefore, deterioration in image quality occurs.

Even if an advanced scene detecting method is used, it is difficult to conquer such false detection completely.

SUMMARY OF THE INVENTION

An object of the present invention is to provide an image processing device, which detects a level of a scene change, and performs high-efficient image quality correction, an image display unit using the device thereof, and an image processing method.

Means for Solving the Problem

A first aspect of the present invention provides an image processing device operable to correct image quality of input image signals, the image processing device comprising: an image signal storing unit; a target correction amount calculating unit; a scene change amount calculating unit; a correction amount calculating unit; and a correcting unit. The image signal storing unit is operable to store the input image signals, the target correction amount calculating unit is operable to calculate target correction amount from an input image signal of a present frame. The scene change amount calculating unit is operable to calculate a scene change amount, based on the input image signal of the present frame and an input image signal of a previous frame existing previous to the present frame, the input image signal of the previous frame being stored in the image signal storing unit. The correction amount calculating unit is operable to calculate a correction amount for the input signal of the present frame, based on the target correction amount and the scene change amount. Furthermore, the correcting unit is operable to correct the input image signal of the present frame using the correction amount to generate a corrected input image signal, thereby outputting the corrected input image signal as an output image signal.

According to the present structure, not only image quality correction for the present scene, but also more highly precise image quality compensation that considers the scene change degree become possible. As the result, deterioration in image quality due to rapid scene change can be prevented.

A second aspect of the present invention provides an image processing device operable to correct image quality of input image signals, the image processing device comprising: a target correction amount calculating unit; a scene change amount calculating unit; a correction amount calculating unit comprising a correction amount storing memory; and a correcting unit. The target correction amount calculating unit is operable to calculate a target correction amount from an input image signal of a present frame. The scene change amount calculating unit is operable to calculate a scene change amount for the input image signal of the present frame, based on the target correction amount calculated by the target correction amount calculating unit and correction amount for an input image signal of a previous frame existing previous to the present frame, the correction amount being stored in the correction amount storing memory. The correction amount calculating unit is operable to calculate a correction amount for the inputted image signal of the present frame to yield a calculated correction amount, based on the target correction amount calculated by the target correction amount calculating unit and the scene change amount calculated by the scene change amount calculating unit and is operable to output the calculated correction amount as well as to store the calculated correction amount into the correction amount storing memory. Furthermore, the correcting unit is operable to correct the input image signal of the present frame using the correction amount outputted by the correction amount calculating unit to generate a corrected input image signal, thereby outputting the corrected input image signal as an output image signal.

According to the present structure, the scene change amount to the input image signal of the present frame can be calculated based on the correction amount to the input image signal of the previous frame, which is one frame before the present frame. Thereby, the correction amount to the input image signal of the present frame can be determined. As the result, excess correction due to the rapid scene change can be suppressed, and deterioration in image quality can be prevented.

A third aspect of the present invention provides an image processing device operable to correct image quality of input image signals, the image processing device comprising: an image signal storing unit; a characteristic amount extracting unit; a target correction amount calculating unit; a scene change amount calculating unit; a correction amount calculating unit; and a correcting unit. The image signal storing unit is operable to store the input image signals and the characteristic amount extracting unit is operable to extract a characteristic amount from an input image signal of a present frame. The target correction amount calculating unit is operable to calculate a target correction amount, based on the characteristic amount extracted by the characteristic amount extracting unit. The scene change amount calculating unit is operable to calculate a scene change amount based on the input image signal of the present frame and an input image signal of a previous frame existing previous to the present frame, the input image signal being stored in the image signal storing unit. The correction amount calculating unit is operable to calculate a correction amount for the input image signal of the present frame based on the target correction amount and the scene change amount. Furthermore, the correcting unit is operable to correct the input image signal of the present frame using the correction amount to generate a corrected input image signal, thereby outputting the corrected input image signal as an output image signal.

According to the present structure, it becomes possible to calculate a target correction amount based on the characteristic amount of the input image signal, that is derived from, for example, a brightness average value or a chroma average value over the whole frame of the input image signal, and hence it becomes possible to perform the image quality compensation. A brightness value or a chroma value of a specific area within the frame may be alternatively regarded as the characteristic amount. Thereby, the target correction amount is calculated based on the alternative characteristic amount, performing the image quality compensation. Thus, according to the present structure, a various kinds of high-precision image quality correction become possible.

A fourth aspect of the present invention provides the image processing device as defined in the third aspect, wherein the characteristic amount extracted by the characteristic amount extracting unit includes at least one of a brightness average value, a brightness maximum value, a chroma average value, and a chroma maximum value of the input image signal of the present frame.

According to the present structure, similar features as the image processing device recited in the third aspect possesses can be enjoyed, regarding the brightness average value or the chroma average value of the whole frame of the input image signal as the characteristic amount of the input image signal. Besides, regarding the brightness maximum value or the chroma maximum value in the frame of the input image signal as the characteristic amount of the input image signal, it becomes possible to calculate the target correction amount based on the characteristic amount, performing the image quality compensation.

A fifth aspect of the present invention provides the image processing device as defined in the first aspect, wherein when the scene change amount is smaller than a predetermined threshold value, the correcting unit calculates correction amount for the input image signal of the present frame, based on the target correction amount obtained from the input image signal of the present frame and the correction amount for the input image signal of the previous frame. When the scene change amount is greater than the predetermined threshold value, the correcting unit calculates the correction amount for the input image signal of the present frame, based on only the target correction amount obtained from the input image signal of the present frame.

According to the present structure, the correction amount can be determined by setting a threshold to the scene change amount beforehand. If a user resets the threshold after watching the displayed image, then an image quality that is more favorable to the user's liking becomes available.

A sixth aspect of the present invention provides the image processing device as defined in the second aspect, wherein the correcting unit comprises a function generator, a maximum change amount calculating unit, a comparing unit, and a correction amount storing memory. The function generator is operable to generate a function, the maximum change amount calculating unit is operable to calculate a maximum change amount of the correction amount using the function generated by the function generator with the inputted scene change amount as a variable, and the comparing unit is operable to calculate a correction amount for the input image signal of the present frame, using the inputted target correction amount, the maximum change amount of the correction amount, and the correction amount for the input image signal of the previous frame stored in the correction amount storing memory.

According to the present structure, the optimum correction amount can be determined by using a function that is programmed beforehand, determining the maximum change amount of the correction to the scene change amount, and comparing the maximum change amount to the target change amount. Therefore, highly precise image quality compensation is easily attained by giving a function form that reduces flickering of a screen due to the scene change. Preparing a plurality of function forms and choosing a function form optimal for each application device to which the image processing device is employed, the image processing device with very high versatility can be provided.

A seventh aspect of the present invention provides the image processing device as defined in the sixth aspect, wherein the function generated by the function generator is a first-order differentiable-monotonically increasing-continuous function with one variable. Assuming an interval between "0" and "N" (N>0) for the variable to exist, and defining as a linear slope a slope of a line connecting a point of coordinates given by "0" and a value of the function for "0" and a point of coordinates given by "N" and a value of the function for "N", and further assuming "α" and "β" (α<β) as certain variables existing in the interval between "0" and "N"; then, a first derivative of the function for "α" is smaller than the linear slope and a first derivative of the function for "β" is greater than the linear slope.

According to the present structure, a function for correction having a form close to the ideal form, which minimizes flickering of a screen due to the scene change, can be generated. As the result, highly precise image quality compensation becomes possible.

An eighth aspect of the present invention provides the image processing device as defined in the sixth aspect, wherein the function generated by the function generator is a positive-continuous function with one variable, and wherein, assuming an interval between "−N" and "N" (N>0) for the variable to exist, and further assuming "α" (0<α<N) as a certain variable; then, a value of the function for "−α" is smaller than a value of the function for "α".

According to the present structure, it becomes possible for image quality correction to cope with a scene change from a high brightness value to a low brightness value as well as a scene change from a low brightness value to a high brightness value.

A ninth aspect of the present invention provides the image processing device as defined in the sixth aspect, wherein the function generated by the function generator is given by a first-order differentiable polynomial.

According to the present structure, a plurality of function forms can be generated only by changing coefficients of the polynomial; therefore, the structure of the function generator can be simplified. Thus, reduction of the development and manufacture cost can be attained.

A tenth aspect of the present invention provides the image processing device as defined in the sixth aspect, wherein the function generated by the function generator is approximated by a polygonal line composing a plurality of connected lines.

According to the present structure, the structure of the function generator can be further simplified and further reduction of the development and manufacture cost can be attained.

An eleventh aspect of the present invention provides the image processing device as defined in the first aspect, wherein the correction amount calculating unit comprises: a correction amount storing memory operable to store a correction amount of the input image signal; a constant setting unit operable to set a plurality of constants to define a maximum change amount of the correction amount in each of a plurality of small segments that divide a whole region of the scene change amount; a maximum change amount selector operable to select, as the maximum change amount of the correction amount, one of the plurality of constants that corresponds to the scene change amount inputted; and a comparing unit operable to calculate a correction amount of the input image signal of the present frame, based on the target correction amount inputted, the maximum change amount of the correction amount, and the correction amount of the input image signal of the present frame stored in the correction amount storing memory.

According to the present structure, the maximum change amount of the correction amount to the scene change amount can be controlled by constants, and various kinds of image quality compensation are realized by changing a plurality of constants that the constant setting unit sets up.

A twelfth aspect of the present invention provides the image processing device as defined in the eleventh aspect, wherein the plurality of constants set by the constant setting unit are greater-than-zero real numbers and a series of differences between neighboring constants of the plurality of constants makes a series of progressively increasing numbers.

According to the present structure, a function for correction having a form close to the ideal form, which minimizes flickering of a screen due to the scene change, can be easily simulated. Therefore, the structure of the function generator becomes simple and the development and manufacture cost can be reduced.

A thirteenth aspect of the present invention provides an image processing device operable to correct image quality of input image signals, the image processing device comprising: a function generator operable to generate a function $y=f(x)$ with a variable x, the variable x being an input difference value defined as difference between an input image signal of a present frame and an input image signal of a previous frame existing previous to the present frame, and a functional value y being an output difference value defined as difference between an output image signal of the present frame and an output image signal of the previous frame; and a correcting unit operable to correct the input image signal of the present frame using the functional value generated by the function generator to generate a corrected input image signal, thereby outputting the corrected input image signal as an output image signal. The function $y=f(x)$ includes a first portion for the variable x smaller than a value of "N" and a second portion for the variable x equal to or greater than the value of "N", the value of "N" being a certain available value for the input difference value.

According to the present invention, different image quality correction can be performed according to the degree of the difference between the input image signal of the present frame and the input image signal of the previous frame; thereby optimization can be attained in image quality correction.

A fourteenth aspect of the present invention provides the image processing device as defined in the thirteenth aspect, wherein the function $y=f(x)$ is downward convex in the first portion.

A fifteenth aspect of the present invention provides the image processing device as defined in the thirteenth aspect, wherein the function $y=f(x)$ satisfies in the first portion a condition that $f(x/s)<f(x)/s$, for a positive constant "s".

According to these kinds of structure, when the difference between the input image signal of the present frame and the input image signal of the previous frame is large, the correction amount can be increased, and when the difference is small, the correction amount can be reduced; therefore, a flickering between frames can be controlled. Since these kinds of structure can cope with scene change amount having multiple values, false detection of scene change can be reduced.

A sixteenth aspect of the present invention provides the image processing device as defined in the thirteenth aspect, wherein the function f(x) is downward convex in the first portion and includes at least one linear segment with a non-zero slope different from a slope of the second portion.

According to the present structure, since the image processing device in a simple structure can cope with the scene change amount having multiple values, false detection of scene change can be reduced.

A seventeenth aspect of the present invention provides the image processing device as defined in the thirteenth aspect, wherein, when the input image signal having same values for all pixels of a frame changes to a new value at the present frame from a value of the input image signal that has continuously been fed until the previous frame, the input difference value as the variable x is defined as the difference between the input image signal of the present frame and the input image signal of the previous frame, and the output difference value as the functional value y is defined as the difference between the output image signal of the present frame and the output image signal of the previous frame.

According to the present structure, effective suppression becomes possible for such conspicuous flickering as when the screen is switched all the sudden from the situation where the full screen continuously displays the same brightness and color.

An eighteenth aspect of the present invention provides an image processing device operable to correct image quality of input image signals, the image processing device comprising: a function generator operable to generate a function $y=g(x)$ with a variable x, the variable x being an input difference value defined as difference between an input image signal of a present frame and an input image signal of a previous frame existing previous to the present frame, and a functional value y being an output difference value defined as difference between an output image signal of the present frame and an output image signal of the previous frame; and a correcting unit operable to correct the input image signal of the present frame using the functional value generated by the function generator to generate a corrected input image signal, thereby outputting the corrected input image signal as an output image signal. The function $y=g(x)$ includes at least two sets of combination that yield a same functional value y for different variables x.

According to the present structure, the difference between the input image signal of the present frame and the input image signal of the previous frame is classified stepwise to perform effective image quality correction. Since the present structure can cope with the scene change amount having multiple values, false detection of scene change can be reduced.

A nineteenth aspect of the present invention provides the image processing device as defined in the eighteenth aspect, wherein the function $y=g(x)$ includes a first portion for the variable x smaller than a value of "N" and a second portion for the variable x equal to or greater than the value of "N", the value of "N" being a certain available value for the input difference value, and wherein a curve connecting points is downward convex in the first portion, each of the points being defined by coordinates of a smallest variable x among the variables that yield a same functional value y and the functional value y.

A twentieth aspect of the present invention provides the image processing device as defined in the eighteenth aspect, wherein in the first portion of the function g(x), a curve $y=h(x)$ connecting points, each of the points being defined by coordinates of a smallest variable x among the variables that yield a same functional value y and the functional value y, satisfies a condition that $h(x/s) < h(x)/s$, for a positive constant "s".

According to these kinds of structure, when the difference between the input image signal of the present frame and the input image signal of the previous frame is large, the correction amount can be increased, and when the difference is small, the correction amount can be reduced; therefore, a flickering between frames can be controlled. Since these kinds of structure can cope with scene change amount having multiple values, false detection of scene change can be reduced.

A twenty-first aspect of the present invention provides the image processing device as defined in the eighteenth aspect, wherein, when the input image signal having same values for all pixels of a frame changes to a new value at the present frame from a value of the input image signal that has continuously been fed until the previous frame, the input difference value as the variable x is defined as the difference between the input image signal of the present frame and the input image signal of the previous frame, and the output difference value as the functional value y is defined as the difference between the output image signal of the present frame and the output image signal of the previous frame.

According to the present structure, effective suppression becomes possible for such conspicuous flickering as when the screen is switched all the sudden from the situation where the full screen continuously displays the same brightness and color.

A twenty-second aspect of the present invention provides an image display device comprising an image processing device and an image display unit. The image processing device comprises: an image signal storing unit operable to store input image signals; a target correction amount calculating unit operable to calculate a target correction amount from an input image signal of a present frame; a scene change amount calculating unit operable to calculate a scene change amount, based on the input image signal of the present frame and an input image signal of a previous frame existing previous to the present frame, the input image signal of the previous frame being stored in the image signal storing unit; a correction amount calculating unit operable to calculate a correction amount for the input signal of the present frame, based on the target correction amount and the scene change amount; and a correcting unit operable to correct the input image signal of the present frame using the correction amount to generate a corrected input image signal, thereby outputting the corrected input image signal as an output image signal. The image processing device is, in accordance with the scene change, operable to correct an externally fed input image signal to generate a corrected input image signal and operable to output the corrected input image signal as an output image signal. The image display unit is operable to display the output image signal outputted by the image processing device.

A twenty-third aspect of the present invention provides the image display device as defined in the twenty-second aspect, wherein the image display unit includes at least one of a liquid crystal display and a plasma display.

According to these kinds of structures, adopting the image processing device according to the first aspect of the present invention leads to the realization of an image display device that possesses the same features as those of the image processing device. High quality images can be displayed using an image display unit, which is mostly used these days. In particular, shortage of contrast and color saturation, which are problems in these image display units, can be improved.

BRIEF DESCRIPTION OF THE DRAWINGS

FIG. 9 (b) shows how to perform the correction according to the fifth Embodiment of the present invention (an example of correction amount as a function of time);

FIG. 9 (c) shows how to perform the correction according to the fifth Embodiment of the present invention (an example of an output image signal as a function of time);

DETAILED DESCRIPTION OF THE INVENTION

Hereinafter, embodiments of the present invention are described with reference to the accompanying drawings.

Embodiment 1

Figure 1:
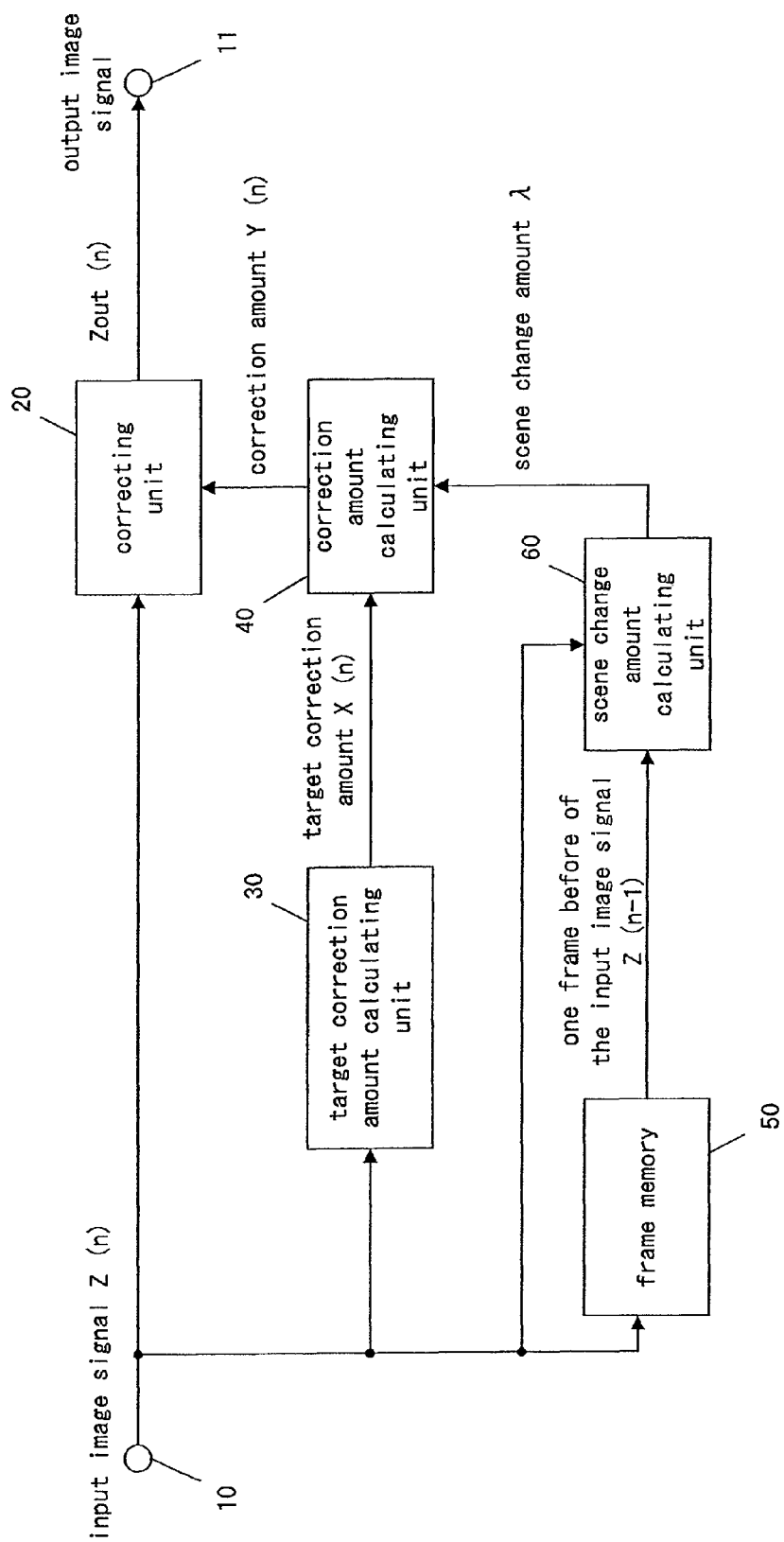
FIG. 1 shows a block diagram illustrating an image processing device according to a first Embodiment of the present invention.

FIG. 1 is a block diagram illustrating the image processing device in a first embodiment of the present invention.

The image processing device of the present embodiment comprises a correcting unit 20, a target correction amount calculating unit 30, a correction amount calculating unit 40, a frame memory 50, and a scene change amount calculating unit 60.

The correcting unit 20 performs image quality correction to an input image signal, which is inputted into an input terminal 10, and the corrected signal is outputted to an output terminal 11 as an output image signal. Image quality correction amount at this time is determined in the correction amount calculating unit 40. The correction amount calculating unit 40 calculates the correction amount based on target correction amount calculated in the target correction amount calculating unit 30, and scene change amount calculated in the scene change amount calculating unit 60.

In the following, operation of each element is explained in detail.

It is supposed that an input image signal Z (n) of a frame (n) is inputted into the input terminal 10. (This frame is hereafter called a present frame or a frame (n).) The target correction amount calculating unit 30 analyzes the input image signal Z (n), and calculates the target correction amount X (n) to the input image signal Z (n) of the present frame.

On the other hand, the frame memory 50 stores an input image signal Z (n−1) of a frame that is one frame previous to the present frame (this frame is hereafter called a previous frame or a frame (n−1)).

The scene change amount calculating unit 60 calculates scene change amount λ, based on the input image signal Z (n) of the present frame and the input image signal Z(n−1) of the previous frame, which is read from the frame memory 50.

As an example, calculation for the scene change amount is explained, focusing on the brightness level of the input image signal Z (n). It is assumed that the brightness level is expressed by an 8-bit brightness value, changing between "0" (the darkest screen) and "255" (the brightest screen).

Assume that the brightness value of a pixel at coordinates (i, j) is Int (i, j; n) for the frame (n) and Int (i, j; n−1) for the frame (n−1), then the scene change amount λ is given by $$\lambda = \Sigma(|A|/|B|),$$

where, $$A = \text{Int}(i,j;n) - \text{Int}(i,j;n-1), \text{ and}$$

$$B = \text{Max}\,[\text{Int}(i,j;n-1), 255 - \text{Int}(i,j;n-1)].$$

The numerator A indicates the difference of the brightness level between the frame (n) and the frame (n−1) of the pixel at the coordinates (i, j); while the denominator B indicates a maximum changeable value of the brightness level of the pixel at the coordinates (i, j).

The symbol Σ means that the sum of the values within ( ) is calculated by scanning i and j over a full screen. The symbol Max means that the larger value is chosen from the two values within [ ].

Using the equations, the degree of the scene change can be quantitatively expressed in terms of the scene change amount λ. For example, when the brightness level of the whole screen does not change, then the scene change amount λ=0. When the brightness level of the whole screen changes by half, then the scene change amount λ=0.5. When the brightness level of the whole screen changes in full, then the scene change amount λ=1.0.

The correction amount calculating unit 40 calculates correction amount Y (n) to the input image signal Z (n), using the target correction amount X (n), which the target correction amount calculating unit 30 has calculated, the scene change amount λ, which the scene change amount calculating unit 60 has calculated, and correction amount Y (n−1) to the input image signal Z (n−1) of the previous frame, which the correction amount calculating unit 40 itself has calculated. The correction amount Y (n−1) is stored in the correction amount calculating unit 40, and the details are mentioned later.

The correcting unit 20 performs the correction to the input image signal Z (n) using the correction amount Y (n), and outputs the corrected input image signal to the output terminal 11 as the output image signal Zout (n). The correction at this time can be Zout (n)=Z (n)*Y (n), or, Zout (n)=p*Z (n)+q*Y (n), where p and q are arbitrary weighting constants. In general, the output image signal Zout (n) can be given by an arbitrary function with the input image signal Z (n) and the correction amount Y (n) as variables.

Calculation of the correction amount performed by the correction amount calculating unit 40 is desirable to suppress flickering of a scene even when the scene change happens rapidly.

Figure 2:
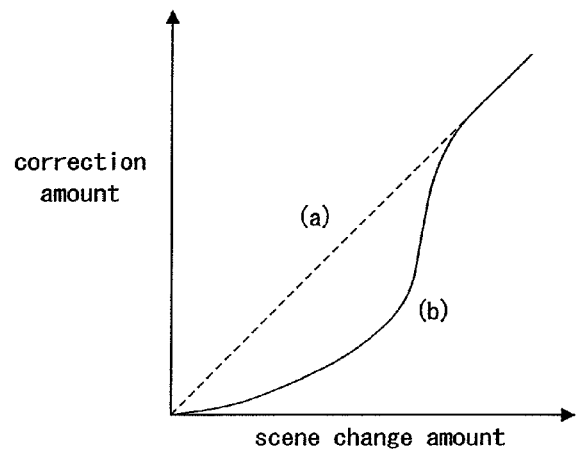
FIG. 2 is an illustrative graph of an ideal correction curve that controls flickering in moving images.

FIG. 2 is an illustrative graph of an ideal correction curve that suppresses flickering in moving images. As a correction curve (b) shows, at a part where the scene change amount is small, the correction amount is controlled small, and at a part where the scene change amount is large, the correction amount is controlled large; thereby, the correction by the correction curve (b) is more desirable, suppressing the flickering better than the correction by a linear correction curve (a).

How the above-mentioned ideal correction curve (b) is specifically realized is important in the calculation of the correction amount performed by the correction amount calculating unit 40. When the correction curve (b) is specifically realized, the flickering and the correction gap often encountered in the prior art can be suppressed. Thereby the image processing corresponding to scene changes can be done, leading to a high quality image to be displayed.

The following embodiments explain specific examples of the correction amount calculating unit 40.

Embodiment 2

Figure 3:
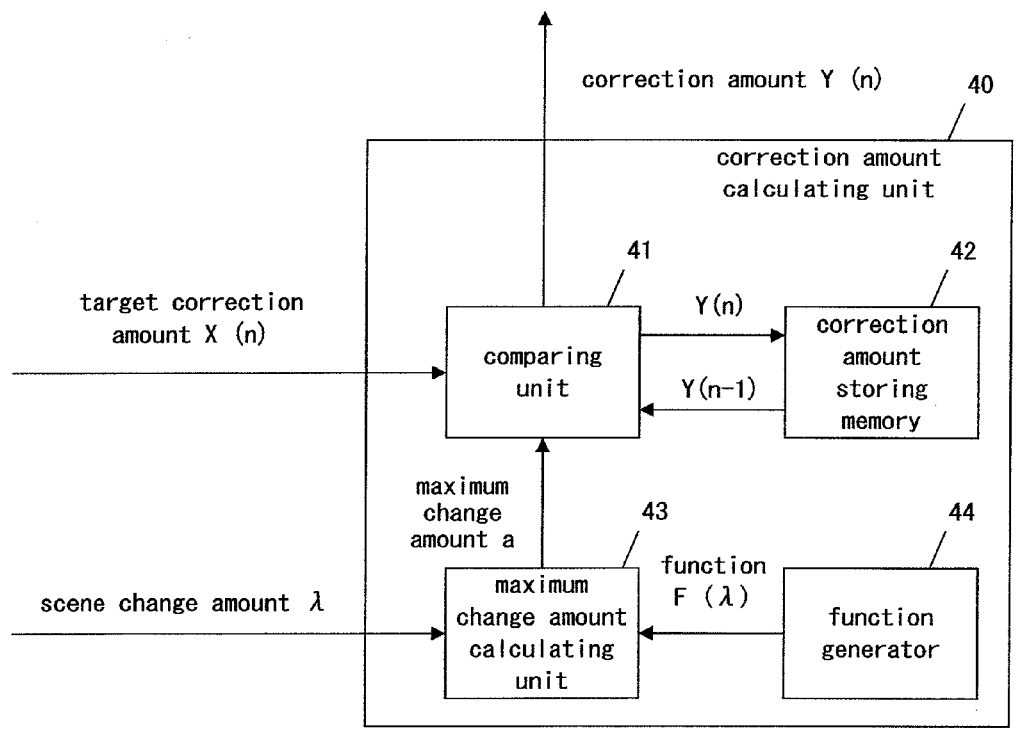
FIG. 3 shows a block diagram illustrating a correction amount calculating unit according to a second Embodiment of the present invention.

FIG. 3 shows a block diagram illustrating a correction amount calculating unit according to a second Embodiment of the present invention. The correction amount calculating unit 40 of the present embodiment comprises a comparing unit 41, a correction amount storing memory 42, a maximum change amount calculating unit 43, and a function generator 44. The target correction amount X (n) is inputted into the comparing unit 41 from the target correction amount calculating unit 30 shown in FIG. 1, and the scene change amount λ, is inputted into the maximum change amount calculating unit 43 from the scene change calculating unit 60 shown in FIG. 1. The correction amount Y (n) is outputted to the correcting unit 20 shown in FIG. 1 from the comparing unit 41.

Next, an outline of operation of the correction amount calculating unit 40 of the present embodiment is explained.

The function generator 44 generates a first-order differentiable-monotonically increasing-continuous function F (λ) for an interval between "0" and "N" (where N>0), in which variable λ exists. Here, "N" may be arbitrarily scaled.

Figure 4:
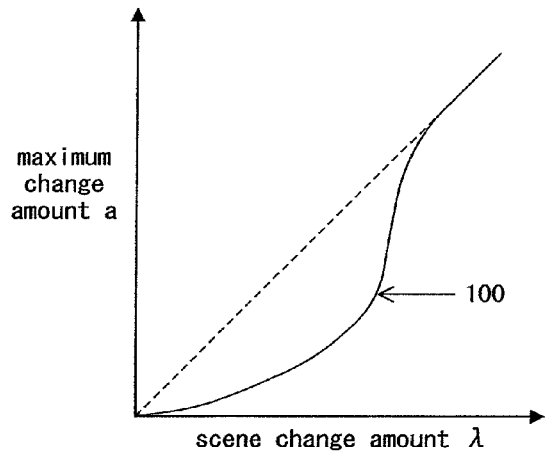
FIG. 4 is a graph roughly sketching a function form generated by a function generator according to the second Embodiment of the present invention.

An outline of the function F (λ) is a curve 100 shown in FIG. 4. FIG. 4 is a graph roughly sketching the form of the function F (λ), generated by the function generator 44 according to the present embodiment. In the figure, a variable of the horizontal axis is the scene change amount λ, and a function value of the vertical axis is a maximum change amount "a".

Using the function F (λ) generated by the function generator 44, the maximum change amount calculating unit 43 shown in FIG. 3 calculates the maximum change amount "a" to the inputted scene change amount λ, as a=F (λ), and outputs the maximum change amount "a" to the comparing unit 41.

The comparing unit 41 calculates the correction amount Y (n) to the frame (n), using the maximum change amount "a" that is calculated by the maximum change amount calculating unit 43, the target correction amount X (n) that is inputted, and the correction amount Y (n−1) to the frame (n−1) that is stored in the correction amount storing memory 42. Simultaneously, the comparing unit 41 stores the newly calculated correction amount Y (n) into the correction amount storing memory 42.

An example of calculation that the comparing unit 41 performs is shown in the following. In this example, the calculation is divided into three cases according to the magnitude of the correction amount Y (n−1) in comparison with the target correction amount X (n).

If $X(n) > Y(n-1)+a$, then $Y(n)=Y(n-1)+a$. (Case 1):

If $X(n) < Y(n-1)-a$, then $Y(n)=Y(n-1)-a$. (Case 2):

If $Y(n-1)-a \leq X(n) \leq Y(n-1)+a$, then $Y(n)=X(n)$. (Case 3):

In other words, according to the present calculating method, when the target correction amount of the frame (n) changes significantly in comparison with the correction amount of the frame (n−1), the correction amount of the frame (n) is suppressed within the change from the correction amount of the frame (n−1) to the maximum change amount. When the target correction amount of the frame (n) changes only in a small amount in comparison with the correction amount of the frame (n−1), the change of the correction amount is not limited. As the result of the present calculation, suppression of the flickering and the correction gap, as well as prevention of the deterioration in image quality due to false detection can be achieved.

Even when the scene change happens rapidly, excessive correction can be suppressed and the deterioration in image quality can be prevented.

A function that the function generator 44 generates can be a function in the form of a polynomial. The curve 100 shown in FIG. 4 may be approximated by a quadratic curve and a straight line for simplicity. For further simplicity, the curve 100 shown in FIG. 4 may be approximated by the polygonal lines which consist of a plurality of segments. In short, if the curve 100 shown in FIG. 4 is approximated in any practicable function, excessive correction can be suppressed and the deterioration in image quality can be prevented even when the scene change happens rapidly. Practicing using such function is naturally encompassed by the present invention as well.

Embodiment 3

Figure 5:
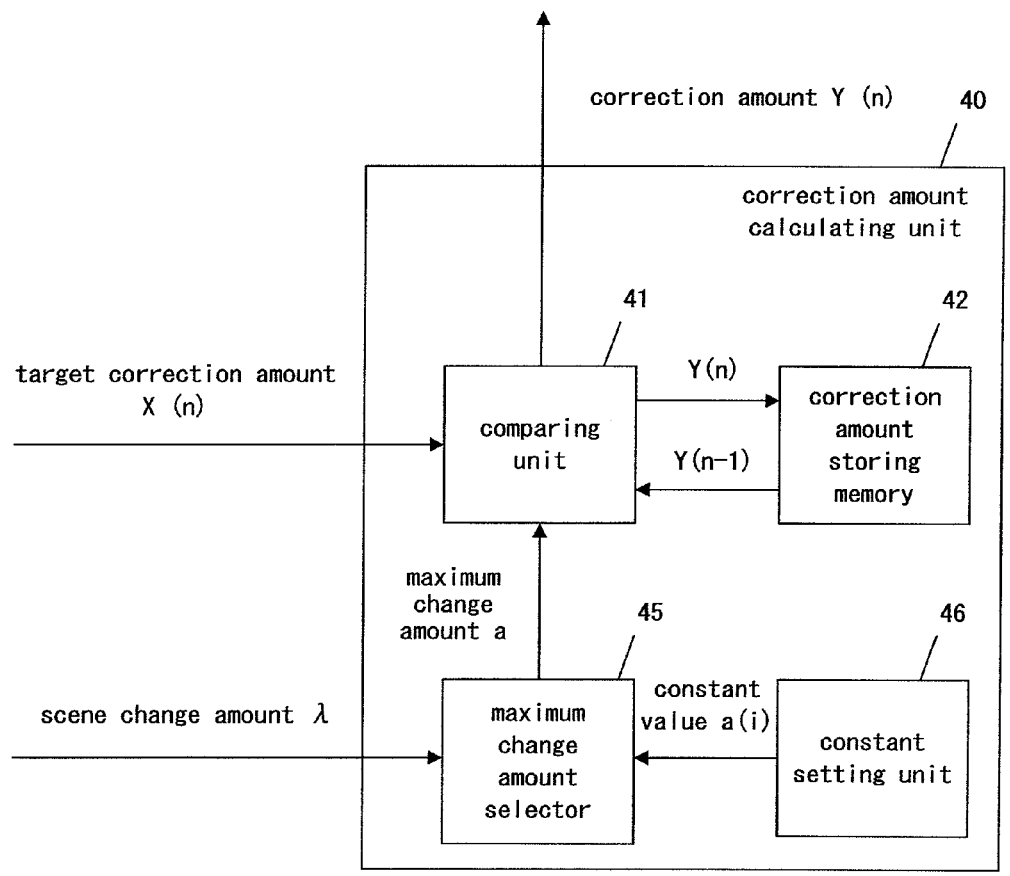
FIG. 5 shows a block diagram illustrating a correction amount calculating unit according to a third Embodiment of the present invention.

FIG. 5 shows a block diagram illustrating the correction amount calculating unit 40 according to a third Embodiment of the present invention. In FIG. 5, the same components as those in FIG. 3 are attached with the same reference symbols or numerals and their descriptions are omitted.

The correction amount calculating unit 40 according to the present embodiment comprises the comparing unit 41, the correction amount storing memory 42, a maximum change amount selector 45, and a constant setting unit 46. The target correction amount X (n) is inputted into the comparing unit 41 from the target correction amount calculating unit 30 shown in FIG. 1; and the scene change amount λ is inputted into the maximum change amount selector 45 from the scene change amount calculating unit 60 shown in FIG. 1. The correction amount Y (n) is outputted to the correcting unit 20 shown in FIG. 1 from the comparing unit 41.

Figure 6:
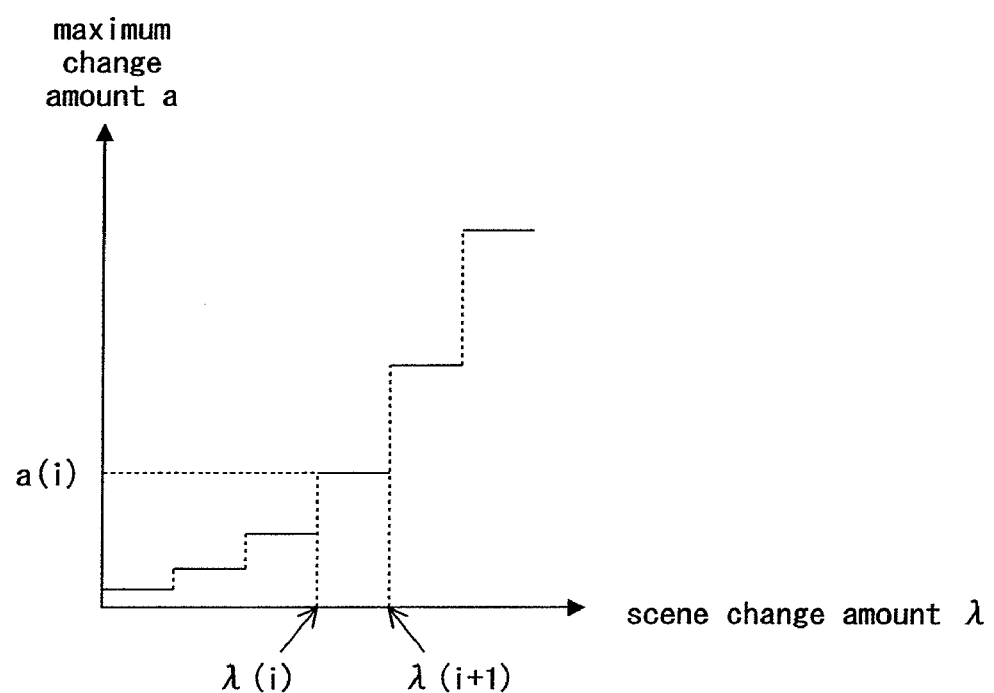
FIG. 6 is a graph illustrating a relationship between scene change amount and maximum change amount according to the third Embodiment of the present invention.

The correction amount calculating unit 40 of the present embodiment approximates the curve 100 shown in FIG. 4 by a step function shown in FIG. 6. FIG. 6 is a graph illustrating a relationship between the scene change amount λ and the maximum change amount" a according to a third Embodiment of the present invention. As shown in this figure, an entire interval in which the scene change amount exists is divided into a plurality of small intervals, and in each small interval the maximum change amount does not change even when the scene change amount changes. For example, in a small interval of the scene change amount λ between λ(i) and λ(i+1), the maximum change amount is given by a constant value a (i).

Next, with reference to FIG. 5, an outline of operation of the correction amount calculating unit 40 of the present embodiment is explained.

When the entire interval in which the scene change amount λ exists is divided into "m" numbers of small intervals, the constant setting unit 46 sets a maximum change amount corresponding to the i-th small interval as the i-th constant a (i) (i=1, 2, ... m). The maximum change amount selector 45 chooses a constant corresponding to the magnitude of the inputted scene change amount λ, and sends the constant to the comparing unit 41. For example, as shown in FIG. 6, when the scene change amount λ is between λ(i) and λ(i+1), the constant a (i) is chosen.

Operation of the comparing unit 41 and the correction amount storing memory 42 is the same as the operation described in the second Embodiment, therefore the explanation is omitted.

A plurality of constants set in the constant setting unit 46 are, for example, greater-than-zero real numbers, and a series of differences of the numbers makes a series of progressively increasing numbers. Then the plurality of constants approximate well the curve 100 shown in FIG. 4. The plurality of constants mentioned above may be given by a geometric series that increases gradually.

A plurality of small intervals into which the entire interval where the scene change amount exists is divided is not necessarily equal in length but may be unequal. Such embodiment is also encompassed in the present invention.

According to the present embodiment, a function for correction possessing a closely ideal form can be easily simulated with relatively simple construction. Consequently, the flickering and the correction gap can be suppressed, preventing deterioration in image quality due to false detection.

Embodiment 4

Figure 7:
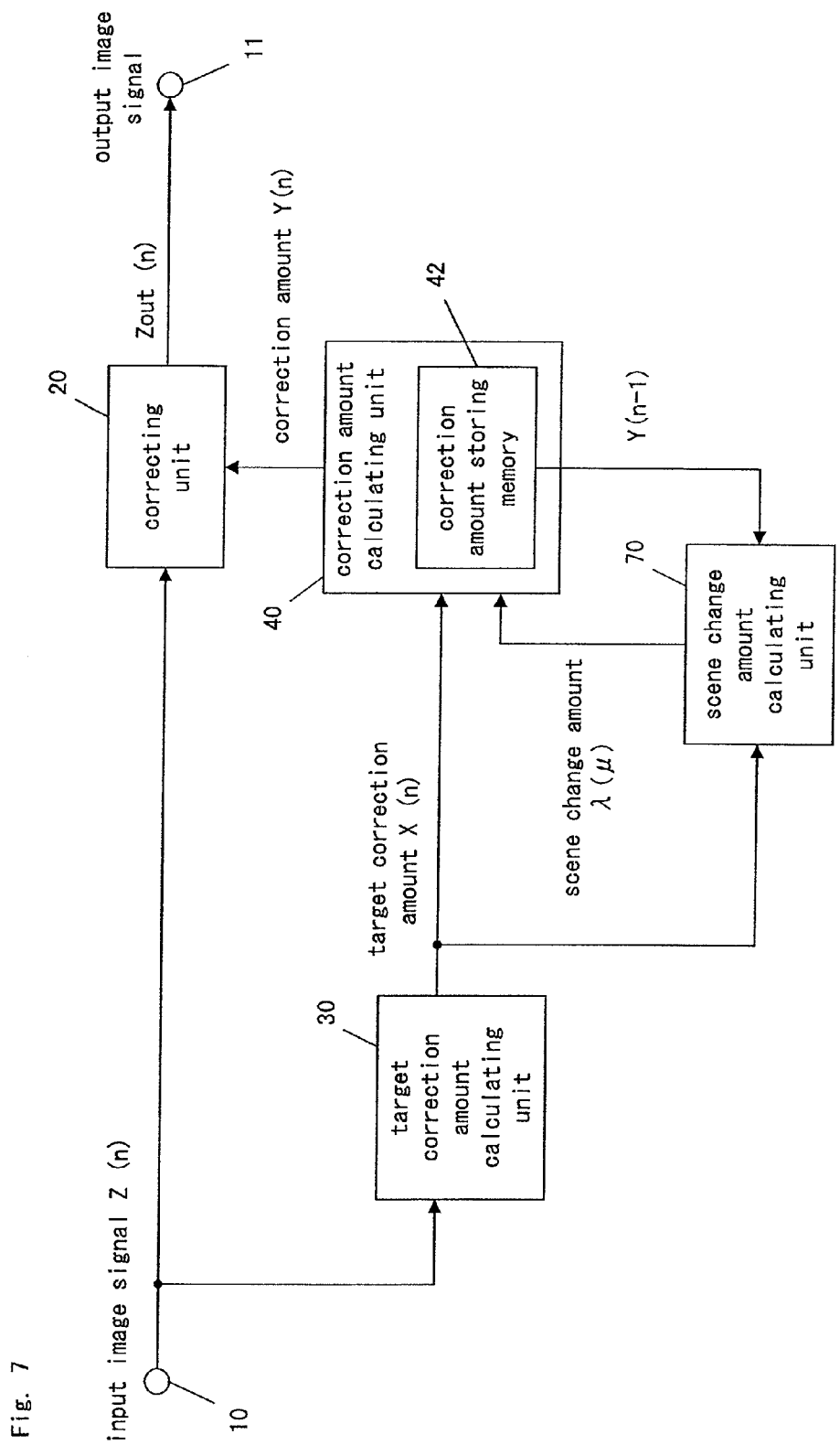
FIG. 7 shows a block diagram illustrating an image processing device according to a fourth Embodiment of the present invention.

FIG. 7 shows a block diagram illustrating an image processing device according to a fourth Embodiment of the present invention. In FIG. 7, the same components as those in FIG. 1 are attached with the same reference symbols or numerals and their descriptions are omitted.

The image processing device according to the present embodiment comprises the correcting unit 20, the target correction amount calculating unit 30, the correction amount calculating unit 40 including a correction amount storing memory 42, and a scene change amount calculating unit 70.

In the present embodiment, the scene change amount calculating units 70 calculates the scene change amount λ based on the target correction amount X (n) to the frame (n) calculated in the target correction amount calculating unit 30, and the correction amount Y(n−1) to the frame (n−1) stored in the correction amount storing memory 42. For example, the scene change amount may be calculated by assuming that λ=|X (n)−Y (n−1)|. In this case, the scene change amount λ is given by an absolute value of the difference between X (n) and Y (n−1).

In the present embodiment, a frame memory is unnecessary and the scene change amount calculating unit 70 does not require any calculation unit for calculating scene change amount. Thereby, the image processing device according to the present embodiment can reduce its circuit scale, leading to a smaller size compared with the image processing device according to the first Embodiment.

Embodiment 5

As in the fourth Embodiment mentioned above, the fifth Embodiment of the present invention uses the block structure of the image processing device as shown in FIG. 7. Therefore, the explanation of each component is omitted.

According to the fifth Embodiment of the present invention, the scene change amount calculating unit 70 shown in FIG. 7 calculates not only the scene change amount but the direction of the scene change, based on the target correction amount X (n) to the frame (n), and the correction amount Y (n−1) to the frame (n−1).

Paying attention to the brightness value of a screen, when a full screen changes from white to black, the scene change amount μ is set as μ=−1, and when the full screen changes from black to white, the scene change amount μ is set as μ=1. For example, using the target correction amount X(n) to the frame (n) and the correction amount Y(n−1) to the frame (n−1), the scene change amount μ is calculated as μ=Y (n−1)−X (n).

Next, the function generator 44 of the correction amount calculating unit 40 shown in FIG. 3 generates the function F (μ) with the scene change amount μ as a variable, which changes from −1 to +1. The outline of the function F (μ) is shown by curves 101 and 102 in FIG. 8.

Figure 8:
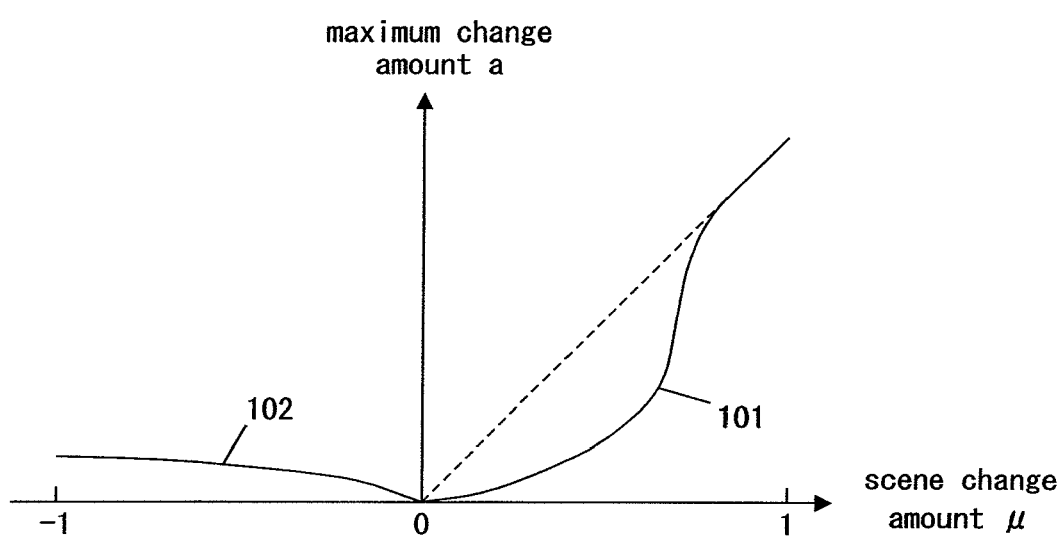
FIG. 8 is a graph roughly sketching a function form generated by a function generator according to a fifth Embodiment of the present invention.

FIG. 8 is a graph roughly sketching the function form generated by the function generator 44 according to the fifth Embodiment of the present invention. The function F (μ) is a positive-continuous function with one variable and defined such that a functional value F (−α) is smaller than a functional value F (α), for a certain variable α in the interval from −1 to +1.

As shown in FIG. 8, using the above-mentioned function F (μ) and setting the maximum change amount to negative scene change amount smaller than the maximum change amount to positive scene change amount, the so-called white saturation does not occur thanks to suppression of the correction amount in the negative direction, even when a significant change occurs frequently on the scene. In other words, by making small the maximum change amount "a" to the negative scene change amount, the correction amount in the negative direction can be suppressed and the flickering of a screen can be suppressed.

Figure 9A:
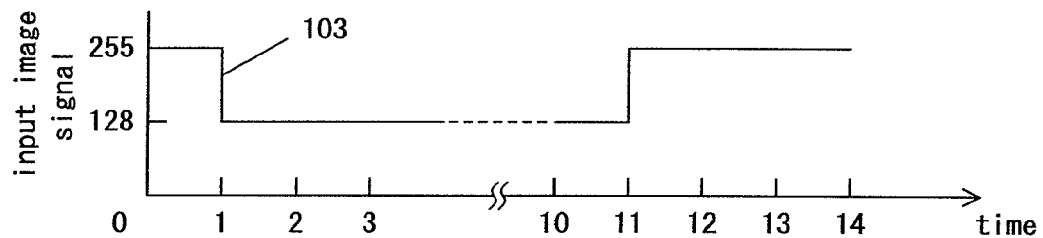
FIG. 9 (a) shows how to perform the correction according to the fifth Embodiment of the present invention (an example of an input image signal as a function of time)
Figure 9B:
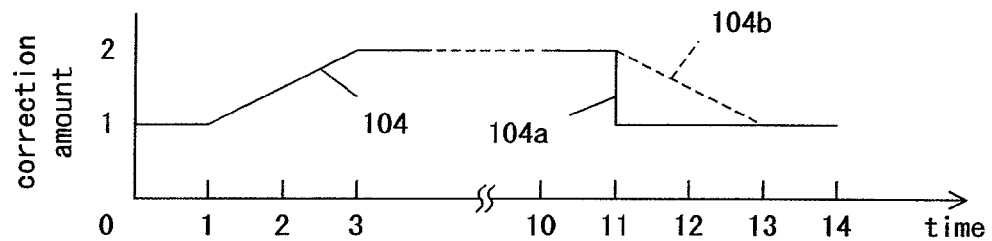
Figure 9C:
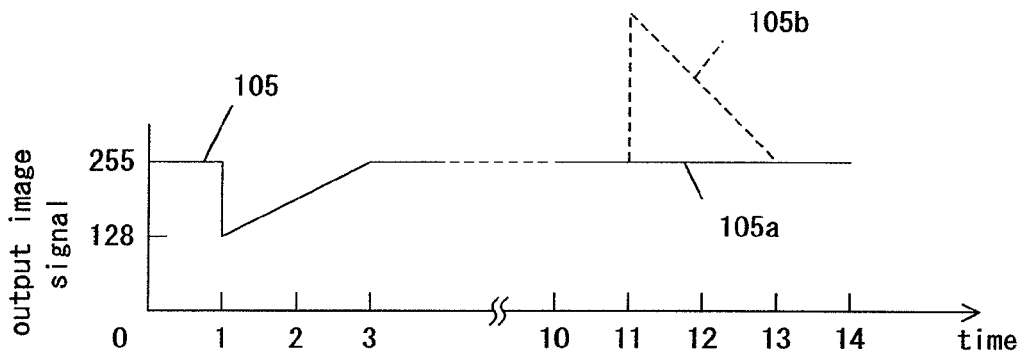

This is explained in more detail using FIG. 9.

FIG. 9 shows how to perform the correction according to the fifth Embodiment of the present invention. Each horizontal axis of FIG. 9 (*a*) to FIG. 9 (*c*) expresses time. FIG. 9 (*a*) shows an example of an input image signal 103 as a function of time; FIG. 9 (*b*) shows an example of a correction amount 104 as a function of time; and FIG. 9 (*c*) shows an example of an output image signal 105 as a function of time. Here, the input image signal 103 and the output image signal 105 are assumed to be brightness signals which take a value of "0" to "255."

When the input image signal 103 has changed rapidly from level "255" to level "128" at the time "1" as a result of the scene change (positive scene change), the correction amount 104 increases gradually from a value of "1" at time "1" to a value of "2" at time "3." Thereby, the output image signal 105 falls temporarily to the level "128" at the time "1," however, the output image signal 105 recovers to the level "255" at the time "3" as a result of the correction.

Next, the correction is explained for a case where the input image signal 103 increases rapidly to the level "255" from the level "128" as a result of a scene change at time "11" (negative scene change). In the correction method of the present embodiment, since the maximum change amount "a" is suppressed for the negative scene change as shown in FIG. 8, the correction is suppressed like a correction amount 104a, and the resultant correction becomes like an output image signal 105a for time "11" to time "13."

If the scene change amount with a sign as in the present embodiment is not used, the correction for the time "11" to the time "13" becomes like a correction amount 104b, and the resultant correction becomes like an output image signal 105b. In an image display unit, the area where the output image signal is over the level "255" is exactly an area in which the so-called "white saturation" has occurred. This fact means that the correction is not performed properly, namely, over-correction is undesirably performed.

Thus, according to the correction method of the present embodiment, it is possible to provide the image processing device that can treat the scene changes in either case; a scene change in the positive direction or a scene change in the negative direction.

Function F ($\mu$) which the function generator 44 of the correction amount calculating unit 40 shown in FIG. 3 of the present embodiment generates, may be a function in a form of polynomial, or may be approximated by a step function. The correction amount calculating unit 40 may take the structure shown in FIG. 5.

Embodiment 6

Figure 10:
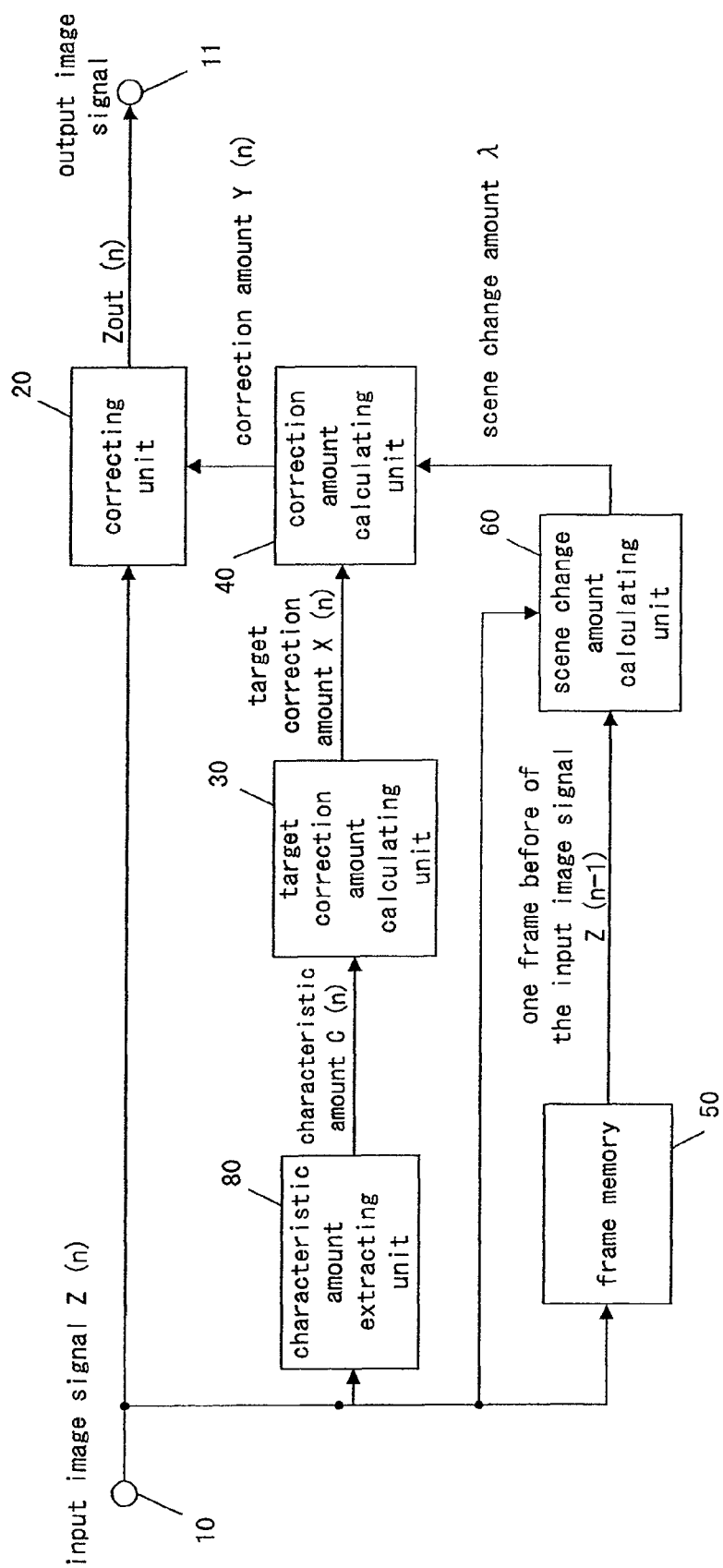
FIG. 10 shows a block diagram illustrating an image processing device according to a sixth Embodiment of the present invention.

FIG. 10 shows a block diagram illustrating an image processing device according to a sixth Embodiment of the present invention. In FIG. 10, the same components as those in FIG. 1 are attached with the same reference symbols or numerals and their descriptions are omitted.

In addition to the first Embodiment of the present invention shown in FIG. 1, the image processing device of the present embodiment comprises further a characteristic amount extracting unit 80.

The characteristic amount extracting unit 80 detects characteristic amount C (n) of an input image signal Z (n) inputted from the input terminal 10, and outputs the characteristic amount C (n) to the target correction amount calculating unit 30 in the latter stage. Using the inputted characteristic amount C (n), the target correction amount calculating unit 30 calculates target correction amount X (n).

One of a brightness average value, a brightness maximum value, a chroma average value, and a chroma maximum value of the input image signal or combined values of more than one of them can be used for the characteristic amount C (n) which the characteristic amount extracting unit 80 extracts.

Thereby, image quality correction with emphasis on brightness value can be performed, or image quality correction with emphasis on chroma value can be set up arbitrarily and can be performed.

The brightness value or the chroma value of a specific area in a frame is also regarded as alternative characteristic amount of the input image signal. Using such characteristic amount of the input image signal, the target correction amount is calculated to perform the image quality correction.

Thus, according to the structure of the present embodiment, various kinds of high-accuracy image quality correction are attainable.

Until the correction amount Y (n) is calculated from the input image signal Z (n), a certain fixed processing time including time necessary for extracting the characteristic amount is needed. Therefore, in the installation of the image processing device of the present embodiment, a memory to store the input image signal Z (n) temporarily may be provided between an input terminal 10 and the correcting unit 20 for the purpose of timing adjustment of the input image signal Z (n) and the correction amount Y (n) in the correcting unit 20.

Embodiment 7

Figure 11:
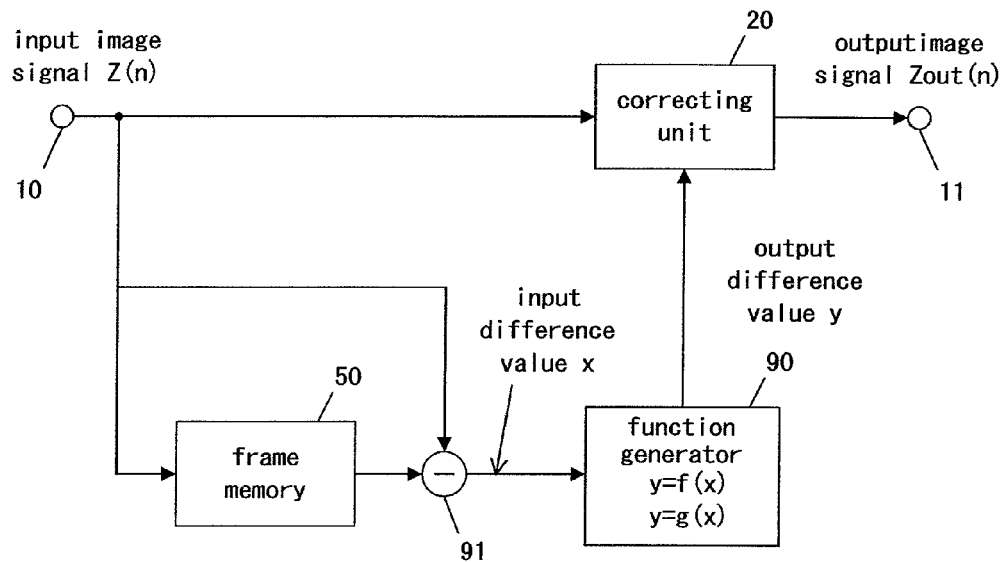
FIG. 11 shows a block diagram illustrating an image processing device according to a seventh Embodiment of the present invention.

FIG. 11 shows a block diagram illustrating an image processing device according to a seventh Embodiment of the present invention. In FIG. 11, the same components as those in FIG. 1 are attached with the same reference symbols or numerals and their descriptions are omitted.

The image processing device of the present embodiment comprises the correcting unit 20, the frame memory 50, a differentiator 91, and a function generator 90. Hereinafter, an outline of operation of the image processing device of the present embodiment is explained. Considering that the flickering of a screen tends to be conspicuous especially in a case where the screen changes suddenly from a state of the screen that all pixels show the same color with the same brightness continuously, such case is described in the following explanation of operation of the image processing device according to the present embodiment.

The differentiator 91 calculates the difference of the input image signal Z (n) of the present frame inputted into the input terminal 10 and the input image signal Z (n−1) of the previous frame stored in the frame memory 50, as an input difference value x=Z (n)−Z (n−1), and outputs "x" to the function generator 90 as a variable. The function generator 90 calculates a functional value y using y=f (x) for the inputted variable "x", and outputs the functional value "y" to the correcting unit 20 as an output difference value. The correcting unit 20 corrects the input image signal Z (n) using the output difference value "y" which the function generator 90 has calculated, and outputs to the output terminal 11 as an output image signal Zout (n). The following equations express the above explanation.

$$Zout(n)=Zout(n-1)+y$$

$$y=f(x)=f(Z(n)-Z(n-1)).$$

Figure 12:
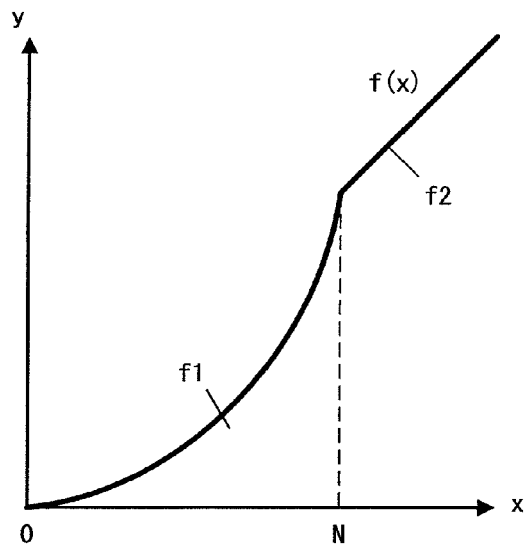
FIG. 12 is a first illustrative graph of a function f (x) according to the seventh Embodiment of the present invention.

FIG. 12 is a first illustrative graph of a function f (x) according to the seventh Embodiment of the present invention. The function generator 90 of the present embodiment outputs the functional value "y" which is the output difference value for the variable "x" which is the input difference value, as shown in FIG. 12. The function f (x) shown in FIG. 12 comprises a first portion f1 and a second portion f2 with a value N as a border. The variable "x" is under the value N in the first portion f1, and the variable "x" is beyond the value N in the second portion f2. More specifically, the first portion f1 is a downward convex curve, and the second portion f2 is a straight line of which the extension passes the origin. As an example, the following equations express the first portion f1 by a quadratic function and the second portion f2 by a straight line.

$$f(x)=N*(x/N)^2, (x<N)$$

$$f(x)=x, (N \leq x).$$

By generating such a function with the function generator 90, according to a degree of the difference of the input image signal of the present frame and the input image signal of the previous frame, different image quality correction is performed and optimization can be attained. When the difference between the input image signal of the present frame and the input image signal of the previous frame is large, a correction amount is made to be large, and when the difference is small, the correction amount is made to be small, therefore flickering across frames can be suppressed. Since it can cope with scene change amount of multiple values, false detection of the scene change can be reduced.

Figure 13:
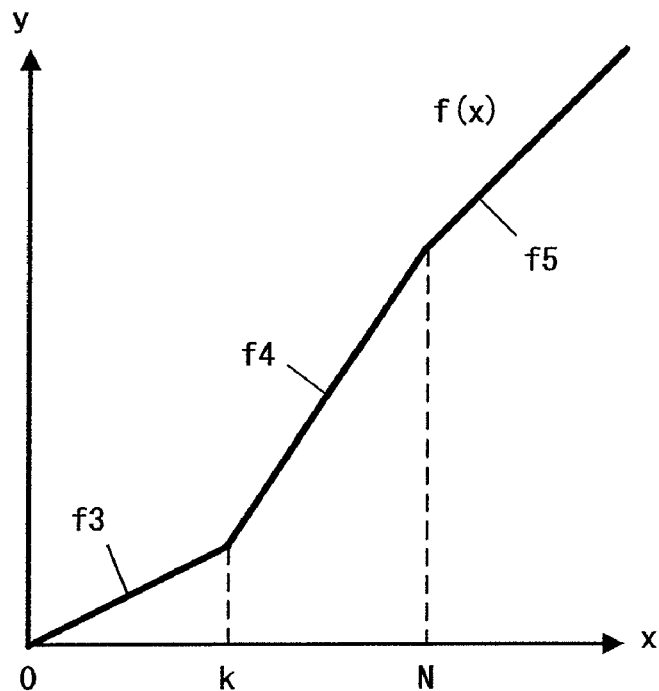
FIG. 13 is a second illustrative graph of the function f (x) according to the seventh Embodiment of the present invention.

Function forms that the function generator 90 generates may be other forms. For example, the other forms may be a polygonal line shown in FIG. 13. FIG. 13 is a second illustrative graph showing the function f (x) according to the seventh Embodiment of the present invention. In this example, the function f (x) comprises the first portion with a straight line f3 and a straight line f4 for a variable "x" under the value N, and the second portion with a straight line f5 for the variable "x" beyond the value N. Namely, $$f(x)=0.5*x, (x<k)$$

$$f(x)=1.5*x-k, (k \leq x<N)$$

$$f(x)=x, (N \leq x)$$

where, $k=N/2$.

The function f (x) of the second illustration also possesses the first portion with downward convex. In this example using the simple polygonal line, an effect almost equivalent to the case where the above-mentioned function of the first illustration is used can be acquired.

Figure 14:
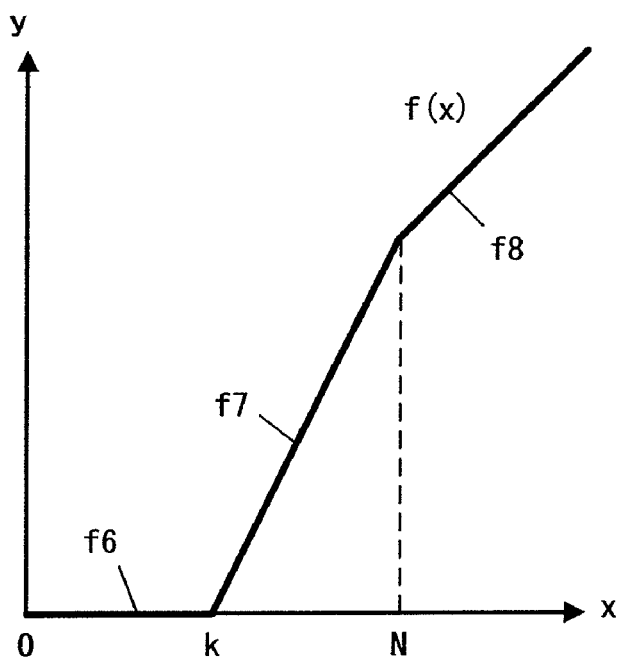
FIG. 14 is a third illustrative graph of the function f (x) according to the seventh Embodiment of the present invention.

FIG. 14 is a third illustrative graph of a function f (x) according to Embodiment 7 of the present invention. In this example, the function f (x) comprises the first portion with a straight line f6 and a straight line f7 for a variable "x" under the value N, and the second portion with a straight line f8 for the variable "x" beyond the value N. Namely, $$f(x)=0, (x<k)$$

$$f(x)=2*x-k, (k \leq x<N)$$

$$f(x)=x, (N \leq x)$$

where, $k=N/2$.

In this example, as shown in FIG. 14, the output difference value is suppressed to "0" for the input difference value which is under the value k, with special consideration on flickering suppression on a dark screen.

With the above-mentioned illustrations, the first portion of the function f (x) of the present embodiment is approximated by a polygonal line consisting of two pieces of line, however the first portion may be composed of a polygonal line consisting of three or more pieces of line. In addition, as a substitution of the function generator 90, a table which outputs the output difference value "y" to the input difference value "x" may be used.

Embodiment 8

A block diagram of an image processing device according to an eighth Embodiment of the present invention is the same as the block diagram of the image processing device according to the seventh Embodiment of the present invention as shown in FIG. 11.

Figure 15:
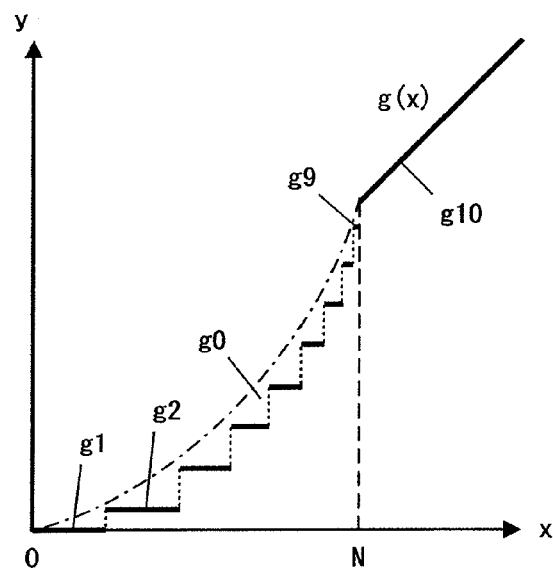
FIG. 15 is an illustrative graph of a function g (x) according to an eighth Embodiment of the present invention.

In the image processing device of the present embodiment, the function generator 90 generates function y=g (x). FIG. 15 is an illustrative graph of a function g (x) according to the eighth Embodiment of the present invention. As shown in FIG. 15, the function g (x) which the function generator 90 of the present embodiment generates comprises step functions g1 to g9 for an interval with the variable "x" under the value N, and a straight line g10, of which the extension passes the origin, for an interval with the variable "x" beyond the value N. The step functions g1 to g9 are selected so that a curve g0 which connects each left end of the step functions g1 to g9 may become convex downward in the interval of 0<x<N. The coordinates of each left end are given by a minimum variable "x" that can be taken with each step function and a functional value corresponding to the variable "x".

By composing the function g (x) in the above-mentioned way, when the difference of the input image signal of the present frame and the input image signal of the previous frame is large, the correction amount is made to become large; when the difference is small, the correction amount is made to become small, thereby flickering across frames can be suppressed. Since it can cope with the scene change amount of multiple values, false detection of the scene change can be reduced.

In addition, as a substitution of the function generator 90, a table which outputs an output difference value "y" to an input difference value "x" may be used.

Embodiment 9

Figure 16:
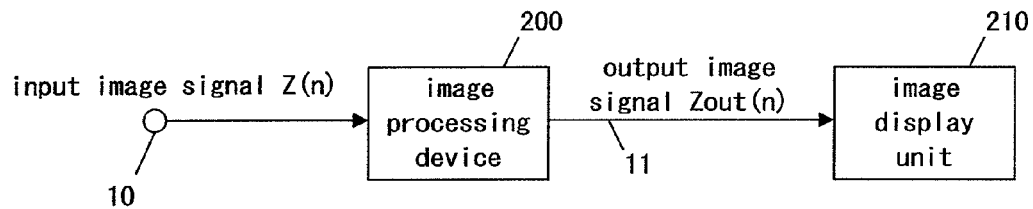
FIG. 16 is a block diagram illustrating an image display device according to a ninth Embodiment of the present invention.
Figure 17:
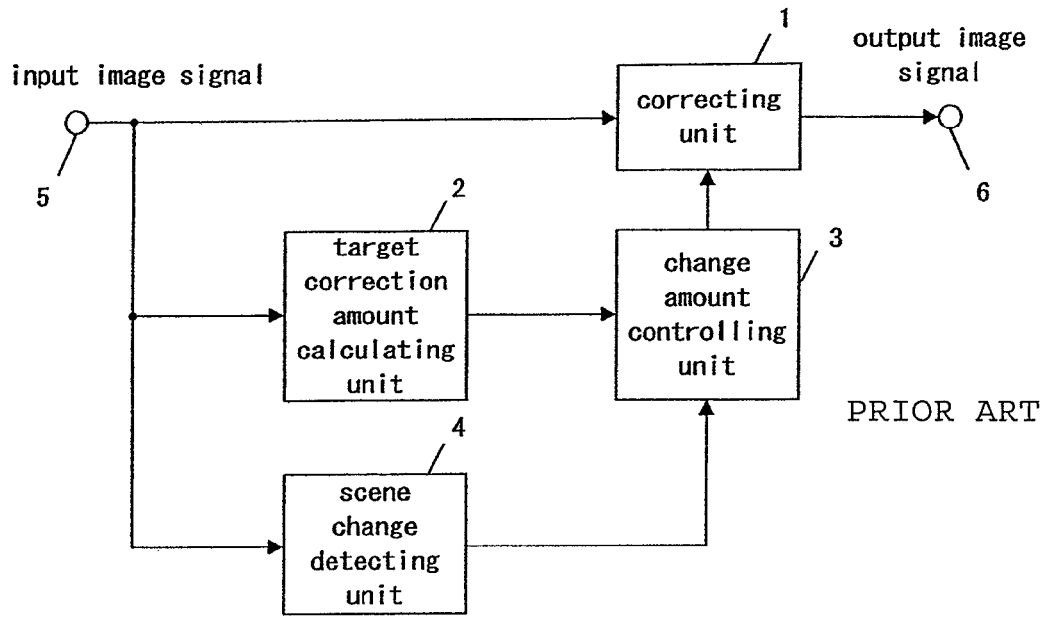
FIG. 17 is a block diagram illustrating a prior image correction device.
Figure 18:
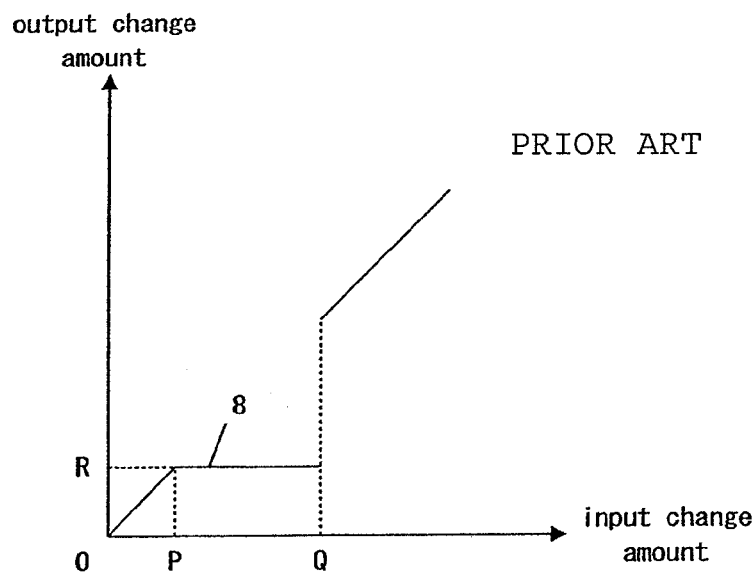
FIG. 18 is a graph illustrating a relationship between input change amount and output change amount, according to the prior image correction device.

FIG. 16 is a block diagram illustrating an image display device according to a ninth Embodiment of the present invention.

The image display device of the present embodiment comprises an image processing device 200 and an image display unit 210. The image processing device 200 is one of the image processing devices explained in the first through ninth embodiments. The image display unit 210 is, for example, a liquid crystal display or a plasma display.

An input image signal Z (n) inputted into the input terminal 10 is processed for image quality correction according to the degree of the scene change in the image processing device 200, and outputted to the terminal 11 as an output image signal Zout (n). The image display unit 210 displays the output image signal Zout (n) to which the image quality correction has been performed.

In the image display device of the present embodiment, as explained in the first through ninth embodiments, an image with highly precise and adaptive image quality correction can be displayed. The highly precise and adaptive image quality correction is performed by detecting the degree of the scene change and considering the degree of scene change; therefore it is different from ordinary image quality correction which considers the present scene only. In particular, in the image display unit like a liquid crystal display or a plasma display for which dynamic range of brightness value is comparatively narrow, the so-called white saturation can be improved.

Consequently, the image display device which prevents deterioration in image quality by false detection of the scene change, and suppresses flickering and a correction gap of a screen can be provided.

As mentioned above, although in the explanation of the embodiments of the present invention, the image quality correction is performed using a brightness signal, the image quality correction may be performed using a chroma signal or an RGB signal.

Although in the explanation of the embodiment of the present invention, the image quality correction to a rapid scene change that accompanies a scene change in a moving picture is performed as an example, the present invention can be equally applied to such a case where a rapid scene change occurs by switching the screen in a still picture.

Thus, the purpose of the present invention is to detect a scene change minutely, to perform more proper image quality correction, and to suppress flickering or a correction gap of the display image. Therefore, unless deviating from the purpose of the present invention, various applications are possible.

What is claimed is:

1. An image processing device, comprising:
   a target correction amount calculating unit operable to calculate a target correction amount based on an input image signal of a present frame;
   an image signal storing unit operable to store the input image signal;
   a scene change amount calculating unit operable to calculate a scene change amount based on the input image signal of the present frame and an input image signal of a frame previous to the present frame that are stored by said image signal storing unit;
   a correction amount calculating unit operable to calculate a correction amount for the input image signal of the present frame based on the calculated target correction amount and the calculated scene change amount; and
   a correcting unit operable to correct, using the calculated correction amount, the input image signal of the present frame to output the corrected input image signal as an output image signal,
   wherein:
   said correction amount calculating unit further comprises: a function generator; a maximum change amount calculating unit; a comparing unit; and a correction amount storing memory;
   said function generator generates a function;
   said maximum change amount calculating unit calculates a maximum change amount of the correction amount using the function generated by said function generator with an inputted scene change amount as a variable;
   said comparing unit calculates the correction amount for the input image signal of the present frame based on an inputted target correction amount, the maximum change amount of the correction amount, and a correction amount for the input image signal of the frame previous to the present frame stored by said correction amount storing memory; and
   the function is one of:
   a first-order differentiable-monotonically increasing-continuous function having a characteristic that reduces the correction amount in a first interval with a smaller scene change amount, and further that enlarges the correction amount in a second interval with a greater scene change amount;
   a first approximate function of the continuous function with a polygonal line; and
   a second approximate function of the continuous function with a step function.

2. An image display device, comprising: the image processing device as defined in claim 1; and an image display unit, wherein:
   said image processing device corrects an input image signal from an exterior according to a scene change thereof; and
   said image display unit displays an image according to the input image signal corrected by said image processing device.

3. The image display device as defined in claim 2, wherein said image display unit is composed of a liquid crystal display and/or a plasma display.

4. An image processing method, comprising:
   calculating a target correction amount based on an input image signal of a present frame;
   storing the input image signal on an image signal storing unit;
   calculating a scene change amount based on the input image signal of the present frame and an input image signal of a frame previous to the present frame that are stored by the image signal storing unit;
   calculating a correction amount for the input image signal of the present frame based on the calculated target correction amount and the calculated scene change amount; and
   correcting, using the calculated correction amount, the input image signal of the present frame to output the corrected input image signal as an output image signal, wherein said calculating the correction amount for the input image signal of the present frame further comprises:
   generating a function;
   calculating a maximum change amount of the correction amount using the generated function with an inputted scene change amount as a variable;
   calculating the correction amount for the input image signal of the present frame based on an inputted target correction amount, the maximum change amount of the correction amount, and a correction amount for the input image signal of the frame previous to the present frame stored by the correction amount storing memory, and
   wherein the function is one of:
   a first-order differentiable-monotonically increasing-continuous function having a characteristic that reduces the correction amount in a first interval with a smaller scene change amount, and further that enlarges the correction amount in a second interval with a greater scene change amount;
   a first approximate function of the continuous function with a polygonal line; and
   a second approximate function of the continuous function with a step function.

* * * * *